Aug. 28, 1951 J. F. KORSBERG 2,565,733
AIRCRAFT ENGINE MOUNT
Filed July 7, 1945 2 Sheets-Sheet 1
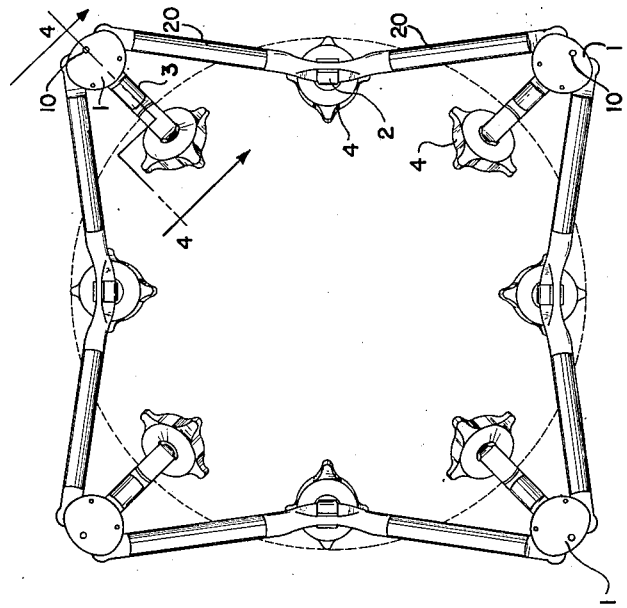
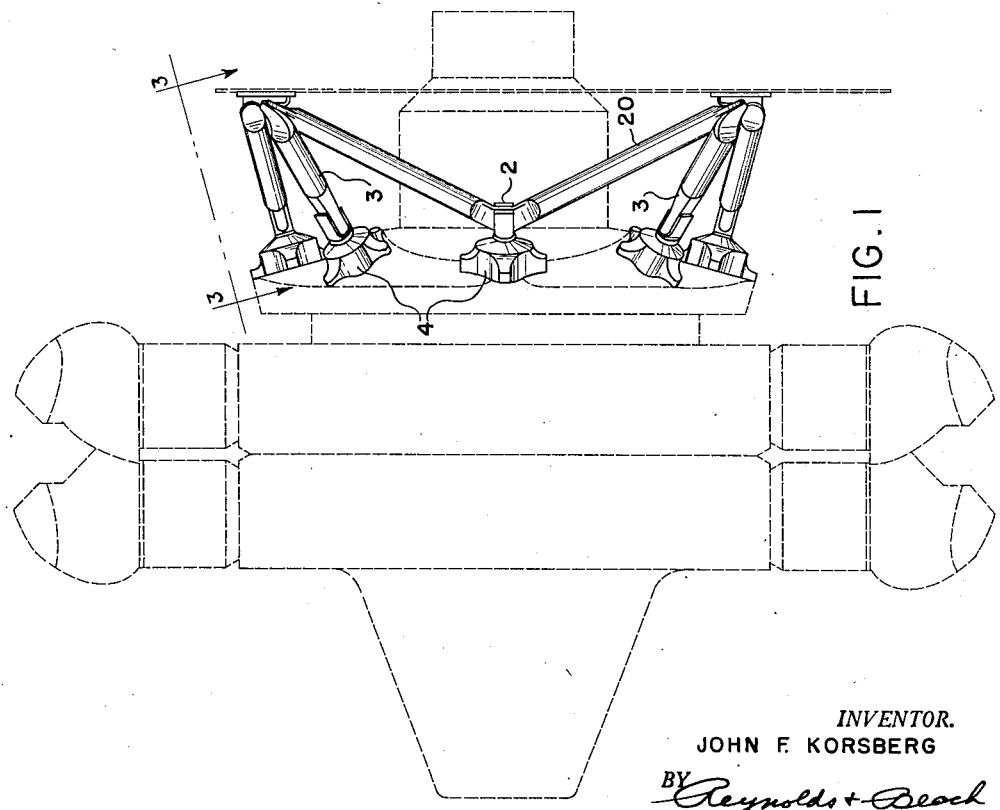
*INVENTOR.*
JOHN F. KORSBERG
BY *Reynolds + Beach*
*ATTORNEYS.*

Aug. 28, 1951  J. F. KORSBERG  2,565,733
AIRCRAFT ENGINE MOUNT
Filed July 7, 1945  2 Sheets-Sheet 2

INVENTOR.
JOHN F. KORSBERG
BY Reynolds & Beach
ATTORNEYS.

Patented Aug. 28, 1951

2,565,733

UNITED STATES PATENT OFFICE 2,565,733

AIRCRAFT ENGINE MOUNT

John F. Korsberg, Seattle, Wash., assignor to Boeing Airplane Company, a corporation of Delaware Application July 7, 1945, Serial No. 603,681

6 Claims. (Cl. 248—5)

My invention relates to a mount for an aircraft engine, and in particular for an engine of the air-cooled radial type. It has been customary heretofore to mount such engines on a tubular ring supported by a triangulated truss of steel tubing welded together to form an integral structure. It is necessary to weld the various elements of such an engine mount while supported in a jig. Moreover the tubular elements must be cut at odd angles before being assembled, and the unequal heating of the welding operation is inclined to warp the engine mount.

The principal object of my invention is to provide an engine mount of simplified construction, which will afford adequate support for such an aircraft engine. More particularly it is an object to form such a mount without the necessity of welding together its various components, and which is composed of only a few types of elements.

A further object of my engine mount is to eliminate the engine mounting ring customarily incorporated in engine mounts, while still supporting the engine at a sufficient number of points. Ordinarily, however, the engine mount will be connected to the aircraft structure at fewer points than to the engine.

The construction of my engine mount also enables its parts to be assembled without the aid of a jig, and it can be again disassembled whenever desired. Moreover the mount can be detached readily from either the engine or the aircraft.

The individual elements of my engine mount are simple to form, and may be secured together quickly and easily. The completed engine mount is considerably lighter than most types previously used.

In addition to the structural advantages of my engine mount discussed above it is capable of blocking transmission of vibrations from the engine to the aircraft more effectively than conventional mounts, and tends to damp engine vibration.

A typical type of engine mount constructed according to my invention has been selected for illustration in the drawings, but it will be understood that the number of connections between the engine or the aircraft and the engine mount may be altered according to the size and type of the engine, and the arrangement, as well as the number, of elements incorporated in the engine mount may be altered to satisfy various design requirements.

Figure 1 is a side elevational view of my engine mount showing the engine in phantom, and Figure 2 is a rear elevational view of such mount.

Figures 3, 4:
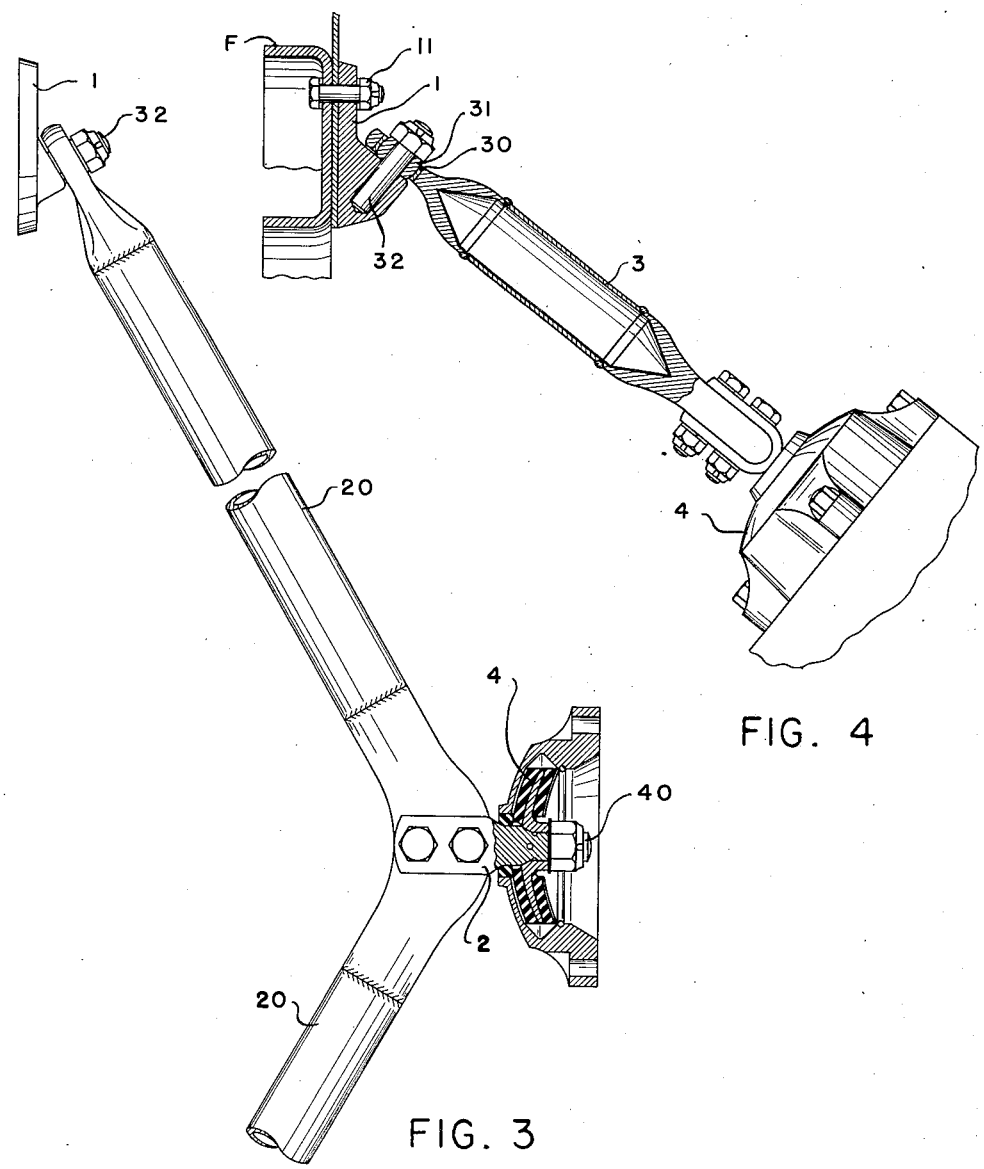
Figure 3 is an enlarged side elevational view of one component of the engine mount, showing parts broken away.
Figure 4 is a side elevational view of a different component of the engine mount with portions broken away.

The general purpose of the engine mount structure is to connect a smaller number of points on an aircraft to a larger number of points on the engine without employing an engine mounting ring. In many instances the attachment points of an aircraft structure from which an engine is supported, such as a nacelle or a fuselage, are disposed in rectangular relationship. In the particular embodiment of my invention illustrated, the engine mount is attached to a nacelle or fuselage at four points defining substantially the corners of a square, whereas the mount is secured to the engine at eight points, preferably arranged substantially in a circle. Various combinations of attaching points may be selected.

The engine mount is composed of links or struts arranged in tripod groups. The links of each group diverge toward the engine from the point of attachment of such group to the supporting aircraft structure. An attaching plate 1 may interconnect the adjacent ends of the tripod legs to define the tripod apex. Each plate has in it a hole 10 adapted to receive a bolt 11 for securing the plate to the engine-supporting aircraft structure. As shown particularly in Fig. 2, these plates may be arranged to define a square.

It is preferred that the adjacent side links of adjacent tripod groups be secured to the same engine attachment point. To simplify the engine mount structure, therefore, such adjacent side links may be formed by a single tube bent centrally so that its bend lies adjacent to the engine and may be connected to it by a straight lug secured to such bend, while the divergent ends form legs disposed in coplanar relationship, each secured to an attaching plate 1. Preferably, however, the same general type of element is formed by securing the divergent legs of a Y-shaped forged swivel lug 2 to straight tubes 20. Such lug includes a pivotal element projecting forwardly, oppositely from the legs, and adapted for connection to the engine to enable the legs to swing about an axis substantially coplanar with such legs. In either type of structure the tubular links 20 at each side of the engine mounting lug diverge toward the engine-supporting aircraft structure, and form with such lug a rigid Y or wishbone strut.

The two side legs of each tripod group are thus formed by the links 20 of different wishbone struts. The intermediate leg 3 of each tripod is a single straight tube. Where such construction principles are followed it will be evident that any such engine mount will be secured to the engine at twice as many points as it is secured to the engine-supporting aircraft structure, regardless of the number of tripod groups employed.

It is preferred that all the legs of the engine mount converge toward the engine, but since it is also desirable to arrange the points of attachment between the engine mount legs and the engine substantially in a circle, it will be evident that the legs 3 will converge toward a point nearer the engine mount than the point at which the planes of the wishbone links 20 intersect. The points of intersection both of the axes of links 3 and of the planes of wishbone links 20 should lie on the longitudinal axis of the engine at the side of the engine's center of gravity remote from the engine mount. In any event it is essential that at least one of these intersection points be disposed on such side of the engine's center of gravity. Moreover it is preferred that the engine attachment points of links 3 and 20 be spaced equidistantly circumferentially to afford the most desirable static and dynamic suspension characteristics.

Although the divergence of links 3 and the planes of wishbone links 20 will vary individually and relatively depending upon the size of the circle defined by the engine attachment points, the size of the square defined by the attaching plates 1, and the spacing of the engine attachment points from the attaching plates 1 in a direction axially of the engine, considerable latitude in selecting these dimensions is permissible. In the arrangement illustrated in the drawings, constituting a typical example, the angle of convergence between the plane of each wishbone link 20 and the longitudinal axis of the engine is 12½°, whereas the angle between each strut 3 and the longitudinal axis of the engine is 38°. It is not necessary, of course, that the engine attachment points be arranged in a circle, although, as stated, such disposition is preferable. By shifting the radial disposition of the engine attachment points for either links 3 or wishbone links 20 the angular relationship between the longitudinal axis of the engine and the corresponding group of links will be varied without altering such angular relationship of the other group.

The legs 3 and 20 of each tripod are not secured rigidly to the attaching plate 1 of such tripod, but on the contrary each has limited movement relative to such plate. The connection of each link to such plate is such as to permit its engine attaching lug to move at least in a diametral plane of the engine, to enable the engine mount to block transmission of engine vibrations to the engine-supporting structure. Such link-to-plate connections also facilitate assembly of the mount. As shown best in Figure 4, each link 3 incorporates a bushing 30 having an internal spherical zone shape which embraces a washer 31 of external complemental spherical zone shape. This washer is secured to the attaching plate by a pin 32 pressed into a socket in the plate or otherwise secured to it. The outer end of such pin is threaded to receive a nut for retaining the washer. Such washer is thicker than the link bushings so that the link end will be held spaced both from the attaching plate and the nut, affording clearance for swinging of the link. The ends of wishbone links 20 are secured to the several attaching plates in precisely the same fashion.

The connections of links 3 and wishbone link lugs 2 to the engine incorporate a shock absorbing unit 4 of conventional type. That illustrated embodies rubber disks bonded to connecting plate members. These disks are stressed in shear by forces radially and circumferentially of the engine, and at least one of them is compressed by the thrust force acting axially of the engine. Such units thus permit slight movement of the engine attachment points universally. In each instance a threaded bolt member 40 rigid with an engine mount leg element and lying in a diametral plane of the engine is connected to the resilient unit. Those bolts integral with links 3 are substantially aligned with such links, while those integral with the wishbone links preferably are substantially coplanar with the divergent legs 20 of the respective wishbone links.

It will be seen that an engine mount of the type described can be constructed and installed very readily and will support the engine securely. All of the wishbone links 2, 20 are alike. When they are secured to the several attaching plates 1, and these in turn are secured by the bolts 11 to the fuselage F or equivalent engine-supporting aircraft structure, their lugs 2 may be swung to a limited degree generally radially of the engine to enable the shock absorbing units 4 to be attached to the engine and to bolts 4. All the intermediate links 3 are also identical and their ends adjacent to the engine may be swung both radially and circumferentially of the engine about their bushings 30 as necessary to dispose their shock units 40 in the proper relationship to the engine.

Although the engine mount is composed of simple elements the engine is engaged at a sufficient number of points so that it will be supported adequately. All the elements of the engine mount may be assembled without the aid of any jig, yet the complete mount is considerably lighter in weight than rigid welded mounts incorporating an engine-supporting ring. The entire mount may be disconnected with the engine from the engine-supporting structure F merely by removing the bolts 11 securing the mount attaching plates 1 to such structure.

I claim as my invention:

1. A mount for supporting an engine from engine-supporting aircraft structure, comprising linkage arranged to form a plurality of tripod groups, connecting means interconnecting the links of each tripod group for relative swinging movement, means operable to attach said connecting means of each tripod group to the engine-supporting aircraft structure, and means operable to attach the legs of said tripod groups to an engine.

2. A mount for supporting an engine from engine-supporting aircraft structure, comprising linkage arranged to form a plurality of tripod groups, connecting means interconnecting the links of each tripod group for relative swinging movement, means operable to attach said connecting means of each tripod group to the engine-supporting aircraft structure, and means operable to attach the side legs of said tripod groups to an engine at points disposed on a circle and spaced equidistantly circumferentially, adjacent legs of adjacent tripod groups being thus attached at a common point, and the intermediate leg of each tripod group being attached to the engine at a point also disposed on such circle and spaced circumferentially equidistantly from the adjacent points of attachment of the side legs of such tripod group.

3. A mount for supporting an engine from engine-supporting aircraft structure, comprising linkage arranged to form a plurality of tripod groups, an attaching plate for each tripod group, universal joint means interconnecting the links of each tripod group for relative swinging movement and securing such links to the said attaching plate of their group, means operable to attach each attaching plate to the engine-supporting aircraft structure, and means operable to attach the legs of said tripod groups to an engine.

4. A mount for supporting an engine from engine-supporting aircraft structure, comprising a plurality of identical wishbone links including lugs dsposed generally centrally thereof, attaching plates securing together adjacent legs of adjacent wishbone links, means operable to secure the lugs of said wishbone links to an engine, and an intermediate link having one end secured to each attaching plate, disposed between the legs of adjacent wishbone links secured to said plate and swingable relative thereto, and having its other end adapted to be secured to an engine.

5. A mount for supporting an engine from an engine-supporting aircraft structure, comprising a plurality of identical wishbone links including lugs dsposed generally centrally thereof, attaching plates securing together adjacent legs of adjacent wishbone links for relative swinging movement, an intermediate link having one end secured to each attaching plate, disposed between the legs of adjacent wishbone links secured to said plate and swingable relative thereto, and means operable to secure the legs of said wishbone links and the other ends of said intermediate links to an engine at points arranged in a circle and spaced equidistantly circumferentially of such circle.

6. A mount for supporting an engine from engine-supporting aircraft structure, comprising a plurality of wishbone links, means securing the central portion of each link to an aircraft engine to dispose the ends of legs of adjacent links in close proximity, and connecting means carried by the aircraft structure and including universal joint means connecting such proximate ends of adjacent legs of adjacent wishbone links for universal relative movement of said link legs through an appreciable angle.

JOHN F. KORSBERG.

REFERENCES CITED

The following references are of record in the file of this patent:

UNITED STATES PATENTS

| Number | Name | Date |
| --- | --- | --- |
| Re. 21,328 | Stitz | Jan. 16, 1940 |
| 1,624,761 | Royce et al. | Apr. 12, 1927 |
| 2,241,139 | Julien et al. | May 6, 1941 |
| 2,260,978 | Klein et al. | Oct. 28, 1941 |

FOREIGN PATENTS

| Number | Country | Date |
| --- | --- | --- |
| 468,578 | Great Britain | July 8, 1937 |